(12) United States Patent
Burnworth et al.

(10) Patent No.: US 7,219,850 B2
(45) Date of Patent: May 22, 2007

(54) MECHANICAL VALVE ASSEMBLY

(75) Inventors: Douglas Burnworth, Confluence, PA (US); Douglas Shaulis, Somerset, PA (US); Timothy DeVore, Rockwood, PA (US); Thomas C. Oyler, Louisville, KY (US)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 10/901,582

(22) Filed: Jul. 29, 2004

(65) Prior Publication Data

US 2006/0022069 A1 Feb. 2, 2006

(51) Int. Cl.
*B05B 1/30* (2006.01)
*B05B 1/00* (2006.01)
*B05B 7/02* (2006.01)
*B05B 9/01* (2006.01)

(52) U.S. Cl. .................. 239/577; 239/323; 239/496; 239/480; 239/525; 239/530; 239/569; 239/579; 239/581.1; 239/586; 239/577; 239/581.3; 239/596; 251/242; 251/82; 251/83; 137/503

(58) Field of Classification Search ........... 239/323, 239/436, 480, 525, 530, 569, 586, 577; 251/82, 251/83, 242; 137/503
See application file for complete search history.

(56) References Cited

U.S. PATENT DOCUMENTS

| | | | | |
|---|---|---|---|---|
| 2,362,946 A | * | 11/1944 | Stockdale | 239/480 |
| 2,675,270 A | | 4/1954 | Clougherty et al. | |
| 2,795,460 A | | 6/1957 | Bletcher et al. | |
| 3,612,406 A | | 10/1971 | Bass et al. | |
| 3,709,438 A | * | 1/1973 | Johnson | 239/417.5 |
| 4,124,164 A | | 11/1978 | Bachman | |
| 4,927,114 A | * | 5/1990 | Baker et al. | 251/240 |
| 4,936,846 A | * | 6/1990 | Dureau | 623/2.34 |
| 5,197,711 A | * | 3/1993 | Geiger et al. | 251/152 |
| 5,205,540 A | * | 4/1993 | Clapp | 251/339 |
| 6,641,061 B1 | | 11/2003 | Hsieh | |
| 6,845,927 B1 | * | 1/2005 | Masson | 239/569 |
| 2005/0189507 A1 | * | 9/2005 | Amaduzzi | 251/82 |

* cited by examiner

*Primary Examiner*—Joseph A. Kaufman
*Assistant Examiner*—James S. Hogan
(74) *Attorney, Agent, or Firm*—Maginot, Moore & Beck (57) ABSTRACT

A water spray nozzle assembly includes an internal channel that is sealable by an internal valve having a seat and a disc. A tilting member is operable to tilt the disc at least partially off of the seat, allowing water to flow through the internal channel. The disc may be further tilted completely off of the seat to provide additional water flow through the water spray nozzle.

12 Claims, 6 Drawing Sheets

MECHANICAL VALVE ASSEMBLY

FIELD OF THE INVENTION

The present invention relates to water spraying nozzles, and in particular, to a spray control mechanism for a water spraying nozzle.

BACKGROUND OF THE INVENTION

Water spray nozzles for use with water hoses are well known. Various nozzles are available including nozzles with multiple spray patterns and nozzles that may be used to mix various fluids or soluble powders with water supplied to the nozzle. Generally, these water spray nozzles include a trigger mechanism which is used to control a valve internal to the spray nozzle. When the trigger mechanism is not activated, the internal valve is shut (or closed) and no water is allowed to flow through the nozzle. Conversely, activation of the trigger mechanism opens the internal valve, and water is allowed to flow through the water spray nozzle.

Closure of the internal valve is typically effected by the provision of a biasing mechanism that operates against the disc of the valve, forcing the disc into sealing engagement with the seat of the valve when the trigger is not activated. Generally, the biasing mechanism forces the disc in the same direction that water moves through the water spray nozzle. Thus, the pressure of the water supplied to the water spray nozzle assists in ensuring that the internal valve does not allow any water to flow through the water spray nozzle until the trigger mechanism is activated.

To activate the trigger mechanism so as to allow water to flow through the water spray nozzle a trigger on the water spray nozzle is typically squeezed. This causes the disc of the internal valve to move directly away from the seat of the internal valve and toward the biasing mechanism and the source of the water. As the disc moves away from the seat of the internal valve, water is allowed to flow around the periphery of the disc and past the seat through the water spray nozzle.

While proving very effective in many respects, the above described internal valve design suffers certain limitations. As described above, the movement of the disc is directly away from the seat. Thus, the force applied to the disc must overcome the entire force of the water pressure and biasing mechanism acting against the disc. Of course, as the water pressure of the source increases, it becomes increasingly difficult to operate the trigger mechanism.

One approach used to overcome this limitation is to fashion the trigger mechanism as a class "1" lever. A class "1" lever has a fulcrum located between the load and the location on the lever where a user applies force. Thus, application of force in a first direction causes the load to move in a direction opposite the first direction. As applied to a water spray nozzle, a class "1" lever is created by placing a fulcrum on the trigger between the portion of the trigger that is grasped by the user and the portion of the trigger that is operably connected to a stem that is used to move the disc. A mechanical advantage is thus achieved, allowing a user to open the internal valve while using less force to activate the trigger mechanism.

Fashioning the trigger mechanism as a lever is very useful in allowing for opening of the internal valve of a water spray nozzle with a reduced amount of force. However, it is commonly desired to operate the water spray nozzle in a mode other than fully open or fully shut. Positioning of the internal valve to a position intermediate the fully opened and fully shut positions is frequently desired so as to govern the force and/or volume of the water exiting the water spray nozzle. Governing of the force of the exiting water is desired because a spray pattern at a given water pressure that provides a gentle spray when the spray is directed at a plant that is ten feet away from a user may provide a torrential blast of water when that same spray is directed at a plant that is two feet away from the user. The blast of water can result in damage to the plant and may splash the user. Similarly, when a specific amount of water is desired to be provided to the plant, a user may desire a slower flow of water to better determine when sufficient water has been supplied to the plant.

However, even in water spray nozzles having a trigger in the form of a class "1" lever, the stem that is used to move the disc away from the seat generally operates to move the disc off of the seat in a uniform fashion forming a gap between the disc and seat around the entire periphery of the disc. Thus, when a user applies sufficient force to the trigger mechanism to move the disc off of the seat, a gap of a relatively large area is rapidly realized between the disc and the seat, allowing a large volume of water to flow through the water spray nozzle. This makes the volume of water passing through the water spray nozzle very difficult to manage. It would be beneficial if the effective cross section of the internal valve were reduced, particularly at lower flow rates.

Additionally, the generation of a large gap between the disc and the seat results in an abrupt drop in the pressure applied to the disc by the pressure of the water source acting against the disc. Thus, once the seal between the seat and disc is broken, a user is typically not able to react quickly enough in reducing the pressure applied to the trigger mechanism to avoid fully opening the internal valve or at least opening the internal valve beyond the position desired. Accordingly, even when a user desires to place the internal valve in an intermediate position, the internal valve is typically opened beyond the desired position, and then the user attempts to adjust the force applied to the trigger mechanism to reduce the water flow to the desired amount. It would be beneficial if the reduction in pressure applied to the disc by the water source pressure and biasing mechanism were less severe.

What is needed is a water spray nozzle that allows a user to easily open an internal valve so as to allow water to flow through the water spray nozzle, while ensuring a tight fit between the disc and seat of an internal valve when the trigger mechanism of the water spray nozzle is in the closed position. What is further needed is a water spray nozzle with an internal valve that is easily positioned to an intermediate position.

SUMMARY OF THE INVENTION

A water spray nozzle in accordance with the present invention overcomes limitations previously encountered with garden hose spray nozzles. The water spray nozzle of the present invention includes a trigger mechanism that tilts the disc of a valve internal to the water spray nozzle with respect to the seat of the internal valve. The leveraging action of the disc when the trigger mechanism is activated provides ease of operation and increased control over the movement of the disc away from the seat.

In one embodiment, a spray nozzle in accordance with the present invention includes a housing, an internal valve, a biasing mechanism and a trigger mechanism. The valve includes a seat and a disc. The disc is biased toward sealing engagement with the seat by the biasing mechanism. The trigger mechanism is operable to tilt the disc at least partially off of the seat.

Advantageously, the trigger mechanism may include a plunger operable to act against a stem attached to the disc to tilt the disc off of the seat. In one embodiment, the trigger mechanism is operable to tilt the disc to the extent that the disc is completely off of the seat.

It is an object of the present invention to provide a spray nozzle assembly that allows for ease of operation while maintaining a tight seal against leakage when the spray nozzle is not activated.

It is also an object of the present invention to provide a spray nozzle assembly with an internal valve that is easily manipulated into a position intermediate a fully open position and a fully closed position, so as to allow a reduced flow of water through the spray nozzle assembly.

It is a further object of the invention to provide a spray nozzle assembly wherein an internal valve is opened by using a lever action to tilt the disc of the seat at least partially off of the seat of the valve.

These and other advantages and features of the present invention may be discerned from reviewing the accompanying drawings and the detailed description of the preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION OF THE INVENTION

Figure 1:
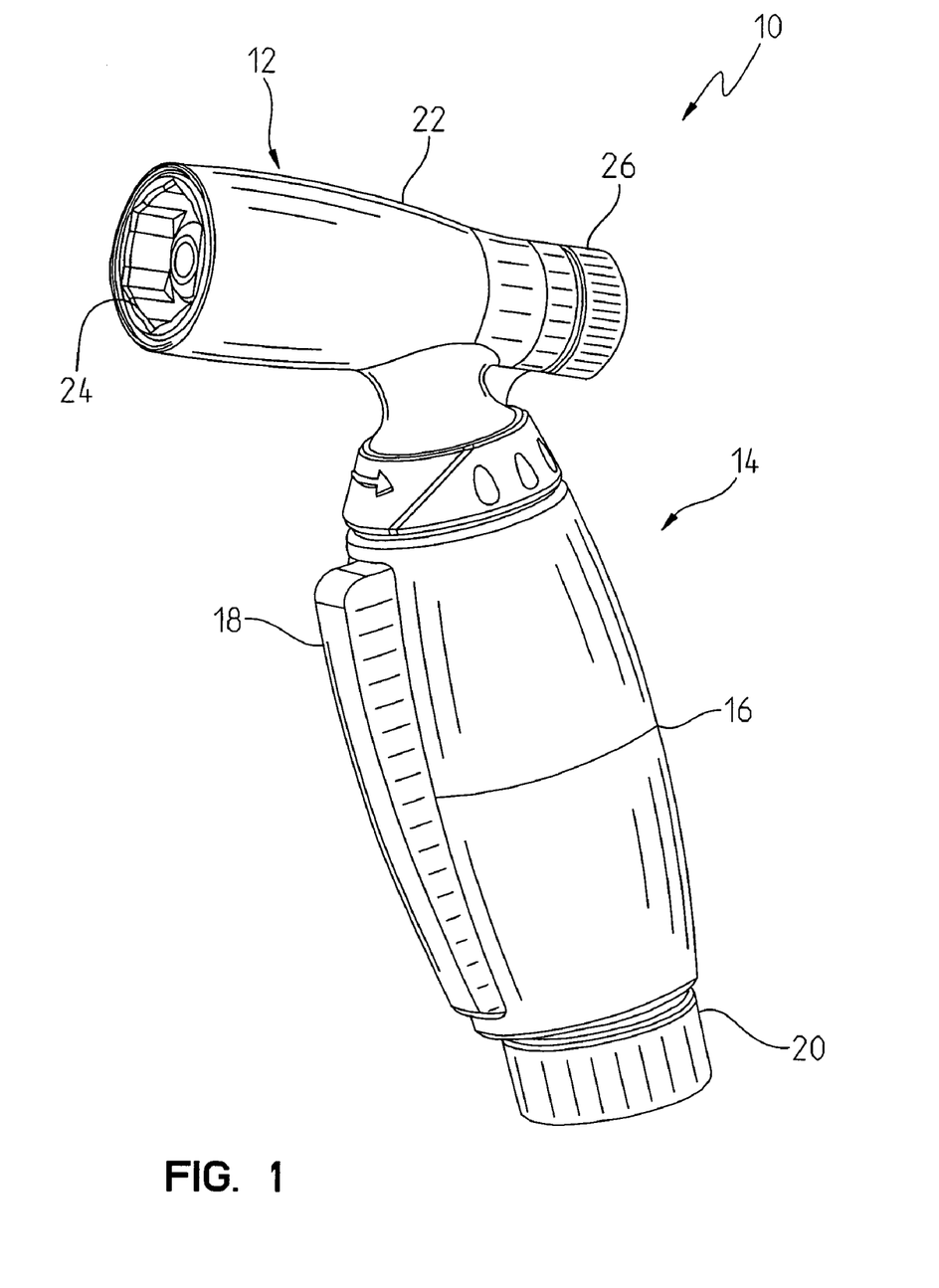
FIG. 1 shows a perspective view of a spray nozzle assembly incorporating features of the present invention.

FIG. 1 shows a spray nozzle assembly 10 which in this embodiment of the invention includes a spray control portion 12 and a handle portion 14. The handle portion 14 includes a handle housing 16, a trigger 18 and a handle portion water inlet 20. The trigger 18 and handle housing 16 are preferably formed of plastic.

The spray control portion 12 includes spray control portion housing 22, spray head 24 and spray control knob 26.

Figure 2:
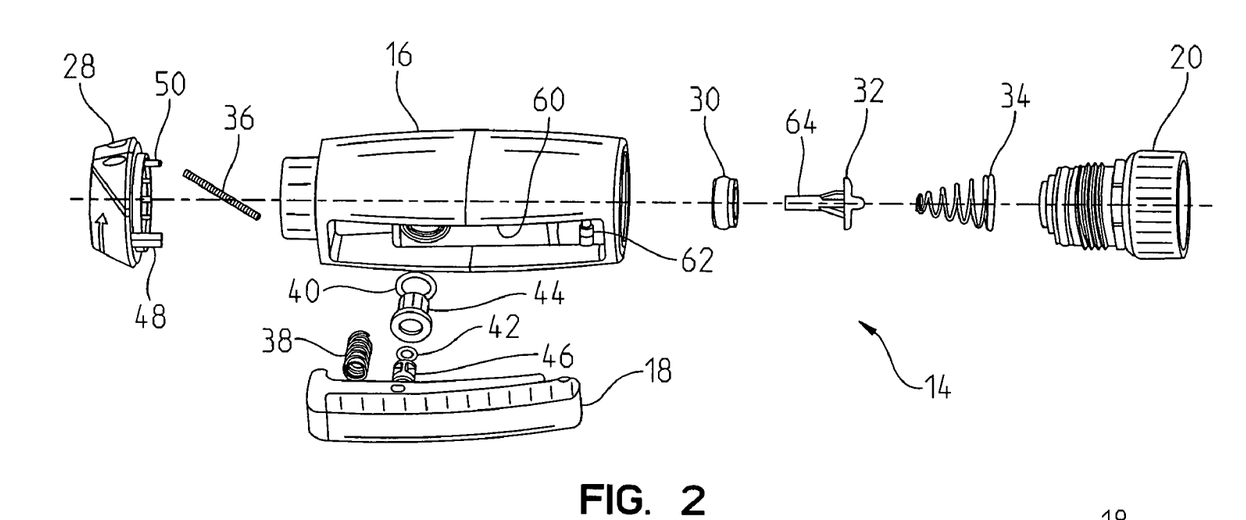
FIG. 2 shows an exploded perspective view of the components of the handle portion of the spray nozzle assembly of FIG. 1.

Referring now to FIG. 2, the handle portion 14 of the spray nozzle assembly 10 is shown in an exploded view. The handle portion 14 includes a lock 28, a seal 30, a disc 32, and a biasing mechanism 34. The spray control portion 12 also includes two springs 36 and 38, two o-rings 40 and 42, a bushing 44 and a plunger 46. The o-rings 40 and 42 and the seal 30 are made of resilient materials.

Figure 3:
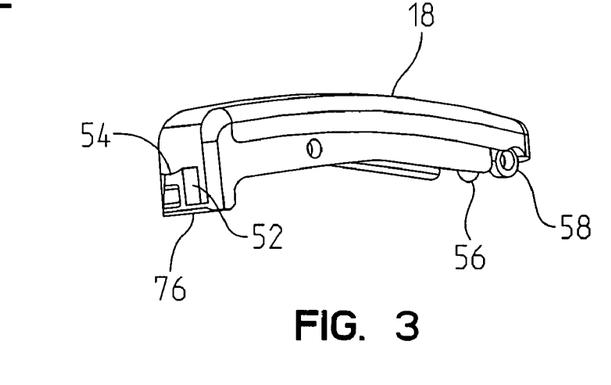
FIG. 3 shows a perspective view of a trigger of the spray nozzle assembly of FIG. 1.

The lock 28 includes locking stem 48 and spring return stem 50. As shown more clearly in FIG. 3, the trigger 18 includes an off notch 52 and an adjacent lock-on notch 54. The off notch 52 is longer than the lock-on notch 54, and the off notch 52 and lock-on notch 54 are open to each other along the entire length of the lock-on notch 54. The trigger 18 also includes two detent retention loops 56 and 58 and a lip 76. Returning to FIG. 2, the disc 32 in this embodiment includes a stem 64.

Figure 4:
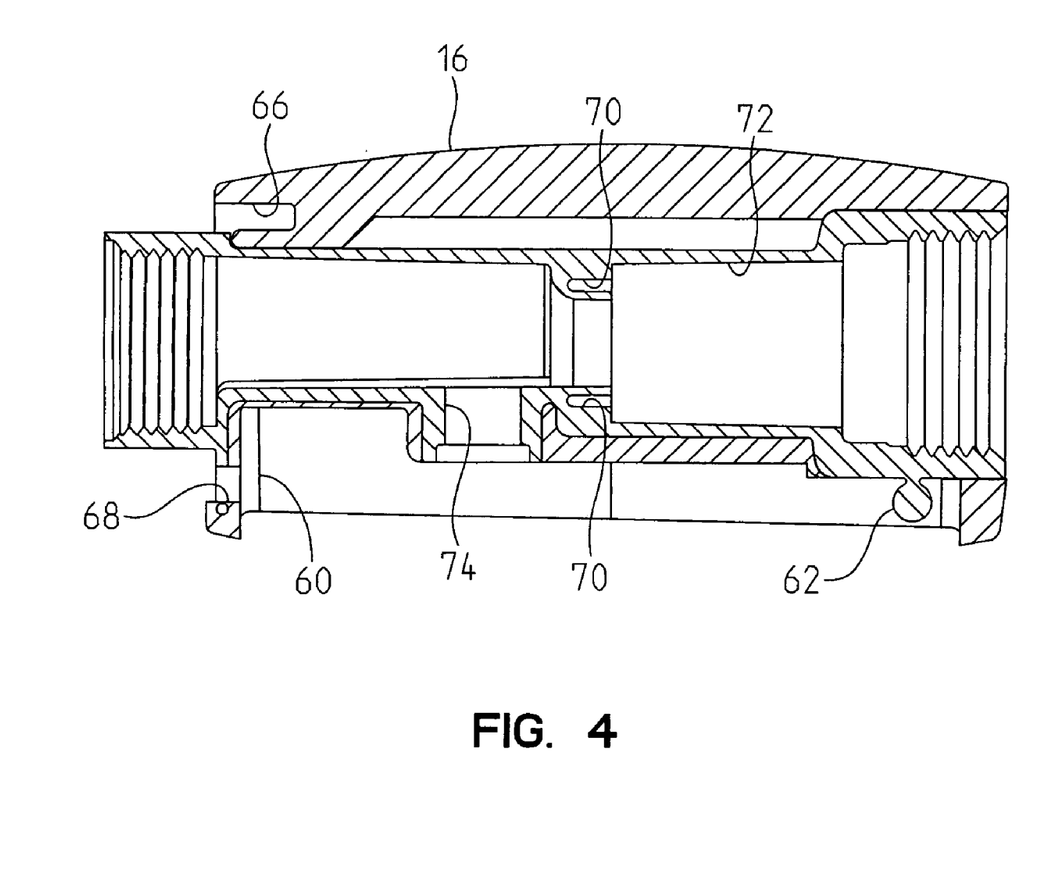
FIG. 4 shows a cross sectional view of the handle housing of the handle portion of FIG. 2.

FIG. 4 shows a cross sectional view of the handle housing 16. The handle housing 16 includes a trigger well 60 and a trigger detent mechanism 62. A spring return well 66 and a lock hole 68 are located at the forward portion of the handle housing 16 and a seal well 70 is located around an internal channel 72. An internal passage 74 is formed between the internal channel 72 and the trigger well 60.

Figure 5:
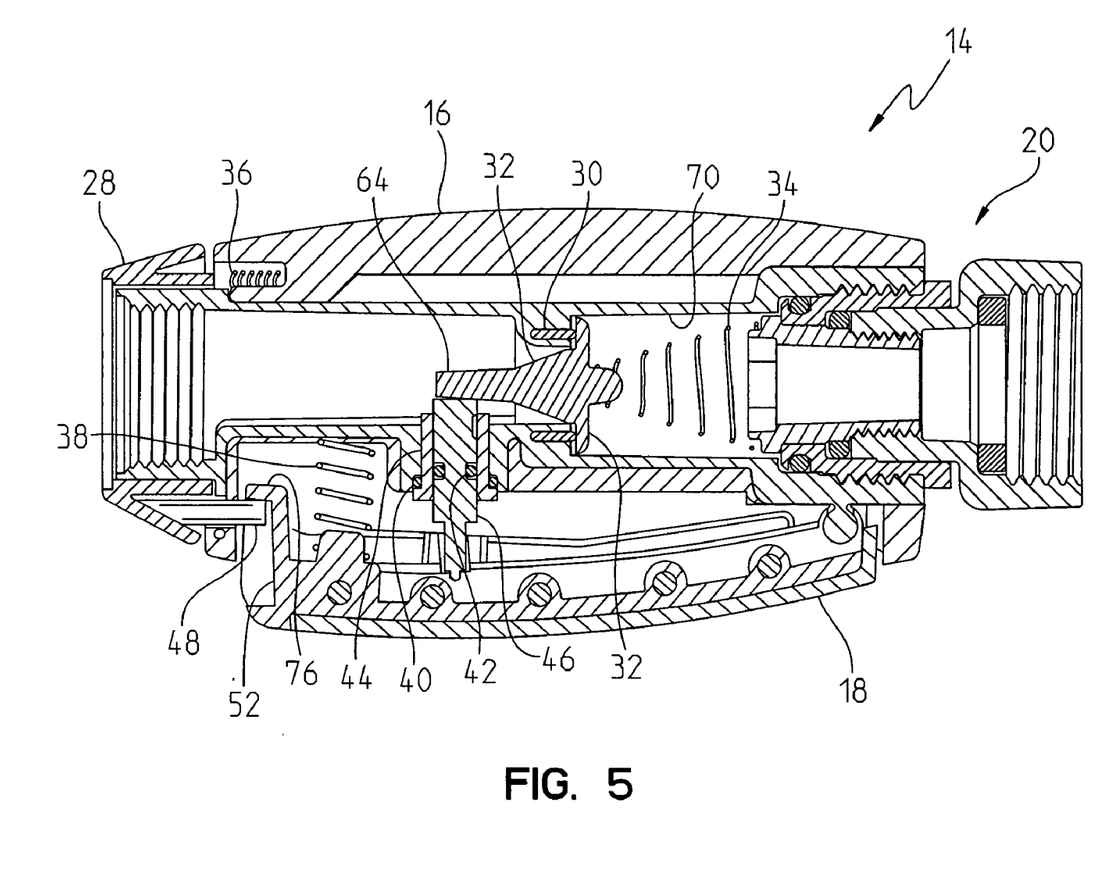
FIG. 5 shows a cross sectional view of the handle portion of FIG. 2 with the internal valve in a closed position.

FIG. 5 shows a cross sectional view of the handle housing 16 fully assembled with the disc 32 sealingly engaging the seal 30. When assembled, the seal 30 is located within the seal well 70 and the disc 32 is located within the internal chamber 72 with the stem 64 of the disc 32 extending through the seal 30. The spring 34 is located between the disc 32 and the handle portion water inlet 20. The handle portion water inlet 20 is screwed into the handle housing 16. In a preferred embodiment, the handle portion water inlet 20 includes a swivel nut assembly as is known in the art.

The spring 34 is sized such that when the disc 32, the spring 34 and the handle portion water inlet 20 are assembled into the handle housing 16, the spring 34 is placed into compression. The spring 34 thus acts as a biasing member urging the disc 32 into sealing engagement with the seal 30. Accordingly, the seal 30 and the disc 32 form an internal valve, with the seal 30 functioning as a seat.

The trigger mechanism is assembled with the o-ring 40 and the bushing 44 inserted within the internal passage 74. The o-ring 42 and the plunger 46 are inserted within the bushing 44. The plunger 46 extends completely through the internal passage 74 and abuts the stem 64 of the disc 32. The spring 38 is located between the trigger 18 and the bottom of the trigger well 60. The detent retention loops 56 and 58 hold the trigger 18 rotatably attached to the detent mechanism 62. The trigger 18 also contacts the plunger 46.

The lock 28 is rotatably attached to the forward portion of the handle housing 16, with the locking stem 48 inserted though the locking hole 68 of the handle housing 16 and into the off notch 52 of the trigger 18. The spring 36 is compressed between the spring return well 66 and the spring return stem 50.

When the handle portion 14 is assembled as shown in FIG. 5, and the trigger mechanism is not activated, the spring 38 pushes against the trigger 18. Because the locking stem 48 is within the off notch 52, the trigger 18 is free to move away from the trigger well 60 until the lip 76 on the trigger 18 abuts the locking stem 48. When the trigger 18 is in this position, the plunger 46 does not exert sufficient force on the stem 64 to tilt the disc 32 off of the seal 30. More specifically, the spring 34 acts against the disc 32 in the direction of the seal 30 causing the disc 32 to sealingly engage the seal 30.

To operate the spray nozzle assembly 10, a user activates the trigger mechanism by grasping the handle portion 14 and squeezing. This forces the detent retention loops 56 and 58 to rotate about the detent mechanism 62. The trigger 18 thus pivots about the detent mechanism 62 against the spring 38.

Figure 6:
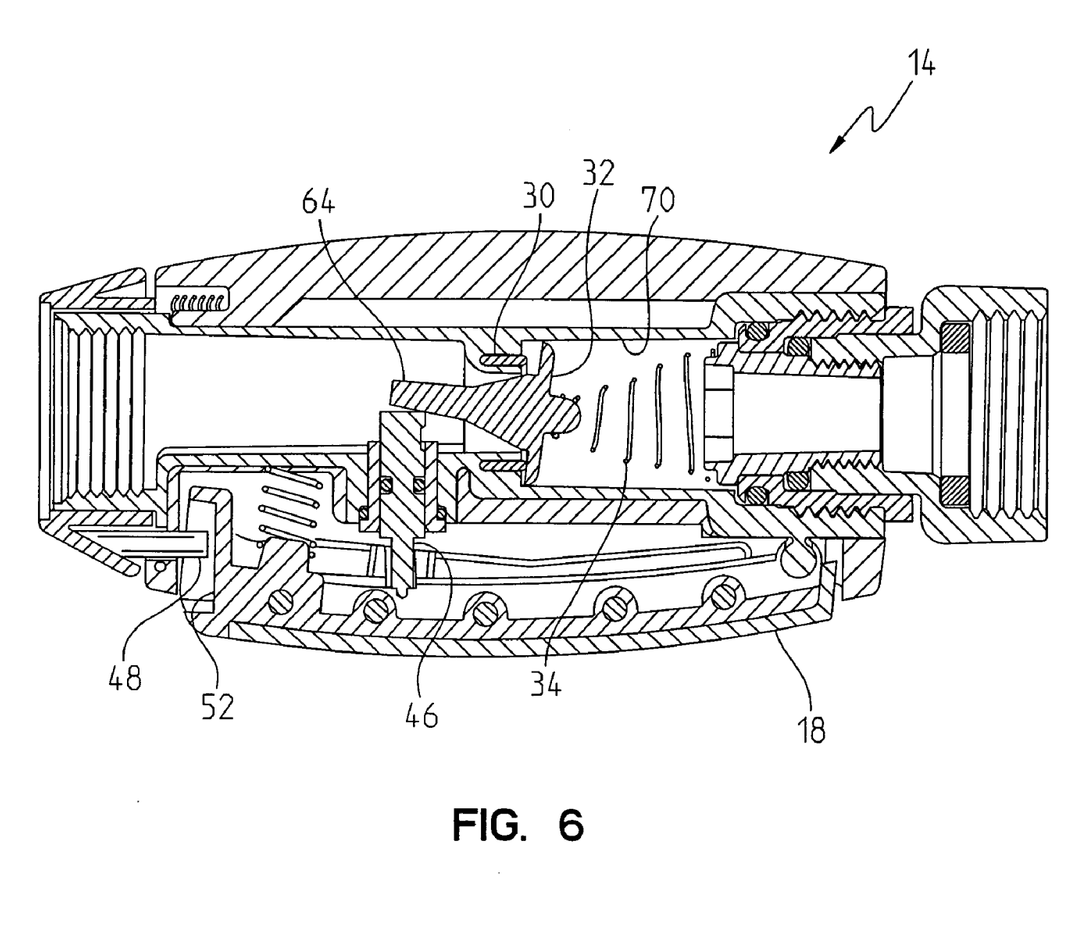
FIG. 6 shows a cross sectional view of the handle portion of FIG. 2 with the internal valve in an intermediate position.

As the spring 38 compresses, the trigger is allowed to move toward the trigger well 60 because the off notch 52 allows the trigger 18 to move with respect to the locking stem 48. Movement of the trigger 18 forces the plunger 46 against the stem 64 of the disc 32. As the plunger 46 is forced against the stem 64 of the disc 32, the disc 32 is tilted partially off of the seal 30. Initially, the disc 32 pivots about the seal 30 as shown in FIG. 6. As the disc 32 pivots, the spring 34 is compressed.

Accordingly, the internal valve formed by the disc 32 and the seal 30 is placed into the intermediate position shown in FIG. 6. In FIG. 6, the disc 32 is tilted to a position partially off of the seal 30. The lower portion of the disc 32 is still in contact with a portion of the seal 30. Thus, the seal 30 functions as a fulcrum as the disc 32 is tilted against the spring 34 and the water pressure from the position of the disc 32 shown in FIG. 5 to the position of the disc 32 shown in FIG. 6. The trigger 18 is located partially within the trigger well 60, and the locking stem 48 is located at an intermediate position within the off notch 52.

Further opening of the internal valve of the spray nozzle assembly 10 is accomplished by further squeezing of the trigger 18 in the manner discussed above. This eventually results in the internal valve of the spray nozzle assembly 10 being positioned in the fully open position shown in FIG. 7. In the fully open position of this embodiment, the disc 32 contacts a portion of the wall of the internal channel 72. Thus, a portion of the wall of the internal channel 72 functions as a fulcrum as the disc 32 is tilted against the spring 34 and the water pressure after the disc 32 is tilted off of the seal 30 to the position of the disc 32 shown in FIG. 6. This allows for the disc 32 to be positioned completely off of the seal 30.

Figure 7:
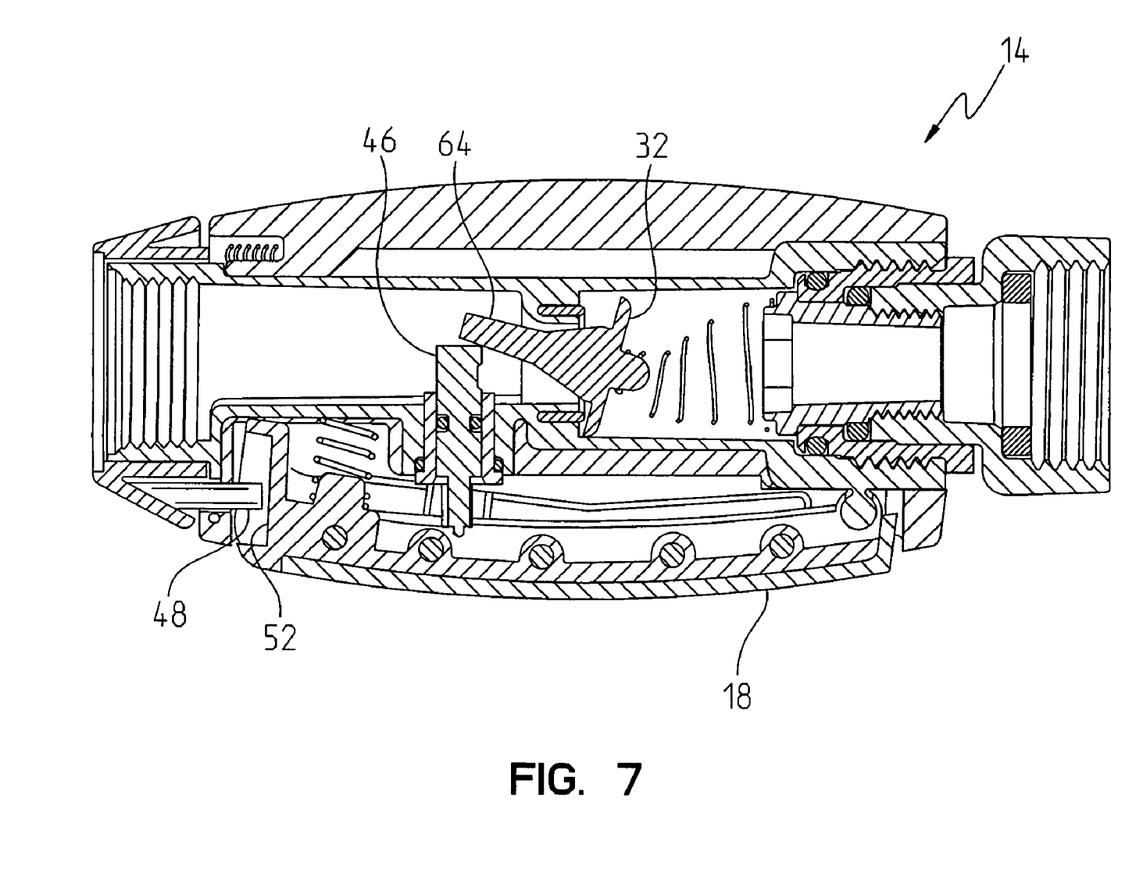
FIG. 7 shows a cross sectional view of the handle portion of FIG. 2 with the internal valve in a fully open position.

Additionally, the locking stem 48 is located within the off notch 52 at a position wherein the off notch 52 and the lock-on notch 54 are open to each other. Accordingly, a user may rotate the lock 28 so as to position the locking stem 48 within the lock-on notch 54. In this position, the trigger mechanism may be released, and the trigger 18 will be maintained in position by the locking stem 48 contacting the edge of the lock-on notch 54. Thus, the internal valve formed by the disc 32 and the seal 30 is maintained in an open position.

Those of skill in the art will appreciate that the above described water spray nozzle offers a number of advantages over prior art water spray nozzles. In addition to the additional control provided by a tiltable disc 32, the trigger 18 is configured to act as either a class "2" or a class "3" lever. In a class "2" lever, the load is between the fulcrum and the point at which force is applied. In a class "3" lever, the force is applied at a location between the load and the fulcrum.

With reference to FIG. 5, the effective load point on the trigger 18 is determined by combining the load applied to the trigger 18 by the spring 38, the spring 34, and the pressure of water applied on the disc 32. The force of the springs 38 and 34 is a function of the respective spring constants. The force applied by the water is a function of the source water pressure and the size and shape of the disc 32. The force of the spring 38 is applied to the trigger 18 at the location where the spring 38 contacts the trigger 18. The force from the spring 34 and the water pressure is applied to the trigger 18 at the location where the plunger 46 contacts the trigger 18. Thus, the effective load point on the trigger 18 will be at a point between the location where the spring 38 contacts the trigger 18 and the location where the plunger 46 contacts the trigger 18.

Accordingly, the trigger 18 may be used as a class "2" lever by applying force to the trigger 18 at a point farther away from the detent mechanism 62 than the effective load point. Alternatively, the trigger 18 may be used as a class "3" lever by applying force to the trigger 18 at a point between the effective load point and the detent mechanism 62 which in either case acts as the fulcrum. Accordingly, a user can obtain the benefits of using trigger 18 either as a class "2" or class "3" lever, merely by adjusting the placement of the spray water nozzle assembly 10 within the user's grasp.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

We claim:

1. A nozzle assembly comprising:
    a housing assembly having (i) an internal channel defining a fluid path, and (ii) a valve seat configured to form an opening which is positioned in said fluid path:
    a valve member positioned within said housing assembly, and having (i) a first end, (ii) a second end, (iii) a sidewall interposed between said first end and said second end, and (iv) a sealing surface configured to sealingly engage said valve seat;
    an actuator movably mounted in relation to said housing assembly and positioned to contact said sidewall of said valve member during movement of said actuator,
    wherein movement of said actuator causes said valve member to pivot in relation to said opening and move at least a portion of said sealing surface away from said valve seat thereby allowing fluid to advance through said opening,
    wherein a first extent of movement of said actuator causes said valve member to utilize said valve seat as a first fulcrum during pivoting of said valve member,
    wherein said housing assembly includes an internal wall that defines said internal channel,
    wherein a second extent of movement of said actuator causes said valve member to utilize a portion of said internal wall as a second fulcrum during pivoting of said valve member,
    wherein said sealing surface of said valve member is completely spaced apart from said valve seat during said second extent of movement of said actuator.

2. The nozzle assembly of claim 1, wherein said movement of said actuator includes linear movement.

3. The nozzle assembly of claim 1, further comprising a spring positioned in contact with said valve member so as to bias said sealing surface against said valve seat.

4. The nozzle assembly of claim 1, wherein said valve member extends through said opening so that (i) said first end of said valve member is positioned on a first side of said opening, and (ii) said second end of said valve member is positioned on a second side of said opening.

5. The nozzle assembly of claim 4, wherein:
    said sidewall of said valve member that is contacted by said actuator during movement of actuator is positioned on said first side of said opening, and said sealing surface of said valve member that sealing engages said valve seat is positioned on said second side of said opening.

6. A nozzle assembly comprising:

a housing assembly having (i) an internal channel defining a fluid path, (ii) a valve seat configured to form an opening which is positioned in said fluid path, and (iii) an internal wall that defines said internal channel;

a valve member positioned within said housing assembly, and having (i) a first end, (ii) a second end, (iii) a sidewall interposed between said first end and said second end, and (iv) a sealing surface configured to sealingly engage said valve seat; and an actuator movably mounted in relation to said housing assembly and positioned to contact said sidewall of said valve member during movement of said actuator, wherein movement of said actuator causes said valve member to pivot in relation to said opening, wherein a first extent of movement of said actuator causes said valve member to utilize said valve seat as a first fulcrum during pivoting of said valve member, wherein a second extent of movement of said actuator causes said valve member to utilize a portion of said internal wall as a second fulcrum during pivoting of said valve member, and wherein said sealing surface of said valve member is completely spaced apart from said valve seat during said second extent of movement of said actuator.

7. The nozzle assembly of claim 6, wherein said movement of said actuator includes linear movement.

8. The nozzle assembly of claim 6, further comprising a spring positioned in contact with said valve member so as to bias said sealing surface against said valve seat.

9. The nozzle assembly of claim 6, wherein said valve member extends through said opening so that (i) said first end of said valve member is positioned on a first side of said opening, and (ii) said second end of said valve member is positioned on a second side of said opening.

10. A nozzle assembly comprising:

a housing assembly having (i) an internal channel defining a fluid path, (ii) a valve seat configured to form an opening which is positioned in said fluid path, and (iii) an internal wall that defines said internal channel;

a valve member positioned within said housing assembly and having a sealing surface configured to sealingly engage said valve seat; and an actuator movably mounted in relation to said housing assembly and positioned to contact said valve member during movement of said actuator, wherein movement of said actuator causes said valve member to pivot in relation to said opening, wherein a first extent of movement of said actuator causes said valve member to utilize said valve seat as a first fulcrum during pivoting of said valve member, wherein a second extent of movement of said actuator causes said valve member to utilize a portion of said internal wall as a second fulcrum during pivoting of said valve member, and wherein all of said valve member is spaced apart from said valve seat during said second extent of movement of said actuator.

11. The nozzle assembly of claim 10, wherein said movement of said actuator includes linear movement.

12. The nozzle assembly of claim 10, further comprising a spring positioned in contact with said valve member so as to bias said sealing surface against said valve seat.

\* \* \* \* \*